(12) United States Patent
Müller

(10) Patent No.: US 6,425,283 B1
(45) Date of Patent: Jul. 30, 2002

(54) DEVICE FOR MONITORING LEAKAGE FOR LONG DURATIONS, ESPECIALLY FOR USE IN FLAT TANK STRUCTURES

(76) Inventor: Sepp Müller, Lecherwiese 5, D-83620 Feldkirchen-Westerham (DE)

( * ) Notice: Subject to any disclaimer, the term of this patent is extended or adjusted under 35 U.S.C. 154(b) by 0 days.

(21) Appl. No.: 09/647,361
(22) PCT Filed: Mar. 31, 1998
(86) PCT No.: PCT/EP98/01853
§ 371 (c)(1), (2), (4) Date: Sep. 29, 2000
(87) PCT Pub. No.: WO99/50635
PCT Pub. Date: Oct. 7, 1999

(51) Int. Cl.[7] ............................ G01M 3/16; B65D 90/50
(52) U.S. Cl. ............................ 73/49.2; 73/40; 137/312; 324/663; 169/66; 169/67; 169/68
(58) Field of Search ............................ 73/432.1, 40, 46, 73/49.2, 49.3, 52; 340/605; 137/312; 324/664, 663; 169/66, 67, 68

(56) References Cited

U.S. PATENT DOCUMENTS

| 1,844,373 | A | * | 2/1932 | Urquhart | 169/66 |
| 3,896,881 | A | * | 7/1975 | De Boer | 169/66 |
| 4,148,361 | A | * | 4/1979 | Christensen | 169/66 |
| 4,433,733 | A | * | 2/1984 | Cunningham | 169/49 |
| 4,781,252 | A | * | 11/1988 | Wilburn et al. | 169/68 |
| 5,314,027 | A | * | 5/1994 | Wood | 169/60 |
| 5,881,762 | A | * | 3/1999 | Janesky | 137/312 |
| 5,884,709 | A | * | 3/1999 | Evans et al. | 169/46 |

FOREIGN PATENT DOCUMENTS

| DE | 3336335 A | * | 5/1985 | | |
| DE | 4037181 A | * | 5/1992 | | |
| EP | 0783100 | | 7/1997 | | |
| JP | 56024542 A | * | 3/1981 | | 73/40 |
| JP | 59068639 A | * | 4/1984 | | |
| JP | 01023981 A | * | 7/1987 | | 340/605 |

OTHER PUBLICATIONS

Patent Abstracts of Japan, vol. 097, No. 003, Mar. 31, 1997 & JP 08 285199 A (Mitsubishi Heavy Ind Ltd), Nov. 1, 1996.
Patent Abstracts of Japan, vol. 095, No. 006, Jul. 31, 1995 & JP 07 086044 A (Toshiba Eng Co Ltd), Mar. 31, 1995.

* cited by examiner

Primary Examiner—Hezron Williams
Assistant Examiner—Michael Cygan
(74) Attorney, Agent, or Firm—Friedrich Kueffner

(57) ABSTRACT

The invention relates to a device for long-term leakage monitoring, in particular of flat tank structures, comprising a sensor cable arranged on the outer surface of the tank casing. A collection chamber which, with respect to its height, is arranged at least partially below the bottom of the flat tank structure, surrounding its circumference preferably in an annular manner, and which via an inclined cantilever is connected with the lower end of the outer surface of the tank casing, with the sensor cable being arranged on the cantilever or in the bottom area of the collection chamber. According to the invention, a fire signalling sensor is located above the collection chamber which, in the case of a fire, in cooperation with an extinguishing supply, enables the activation of the automatic foaming of the collection chamber.

14 Claims, 3 Drawing Sheets

DEVICE FOR MONITORING LEAKAGE FOR LONG DURATIONS, ESPECIALLY FOR USE IN FLAT TANK STRUCTURES

BACKGROUND OF THE INVENTION

1. Field of the Invention

The invention relates to a device for long-term leakage monitoring, in particular for flat tank structures comprising a sensor cable arranged on the outer surface of the tank casing, a collection chamber which, with respect to its height, is arranged at least partially below the bottom of the flat tank structure, surrounding its circumference preferably in an annular manner, and which via an inclined cantilever is connected with the lower end of the outer surface of the tank casing, with the sensor cable being arranged on the cantilever or in the bottom area of the collection chamber.

2. Description of the Related Art

From the German Patent DE 43 22 859 C2, a device for long-term leakage monitoring of double-wall vessel systems, in particular of double-wall tank bottoms, is known.

The device shown therein makes it possible to cyclically or simultaneously monitor with little expenditure a plurality of double-wall tank bottoms with respect to the occurrence of leakage. It can be determined by means of this device whether a leak has occurred on the outer bottom or in the intermediate bottom, whereby it is possible to determine the size and location of the leak. For this purpose, it is proposed therein to attach an intermediate layer at the inner side of an outer bottom, with the layer serving to support the inner part of a double-bottom. A sensor cable with a variable dielectric constant is installed within the intermediate layer in a protective manner. In the case in which a liquid enters the monitored space, the dielectric constant of the sensor cable changes so that the presence of leakage can be determined by means of an appropriate evaluation device.

By means of the special liquid-selective sensor cable, both a leak in the inner space as well as in the outer bottom can be detected. The detection of leaks in the outer casing of the tank, however, still represents a problem. Any leakage which might be present can only be determined visually and only above a certain leakage flow volume. There are also problems if the double bottom has been installed later, e.g. by lining with synthetic material.

DE 39 37 638 A1 proposes to form collection troughs which might comprise a hollow space in order to arrange a monitoring sensor in said hollow space. The collection troughs form the supporting surface for flat tank structures provided thereon so that any escaping liquids from leaks which might occur in the outer casing can also be collected and disposed of without constituting an environmental hazard.

However, problems will also arise if, due to a high surface pressure and thermal alternating stresses, cracking in the trough results. Though existing cracks can be detected by the sensors provided in the hollow spaces upon the ingress of liquids, e.g. environmentally hazardous chemicals, the actual purpose of the collection troughs, however, is no longer ensured in this case.

Finally, under the consideration of the teaching according to DE 39 37 638 A1, it is not possible to correspondingly retrofit already existing tank farms in accordance with environmental protection aspects without extensive disassembly work.

In order to be able to monitor vessels which, for example, contain hydrocarbons, in particular, gasoline, it has been proposed according to DE 33 36 335 A1 to arrange a sensor line at the outside of the vessel wall. The known sensor line comprises a sheathing which is soluble in hydrocarbon and is connected with an evaluation section.

In the case in which, according to the above described known solution, a leak occurs in the outer casing, it is assumed that, due to gravity, escaping liquid runs down the outer wall and comes into contact with the sensor cable arranged at the tank outer surface. In this case, however, the following problems arise. On the one hand, the liquid volume which escapes through the leak cannot be collected easily, and, on the other hand, there is the risk that in the case of major leaks, the liquid stored in the tank, which leaves the tank laterally and in a spraying manner, so that the sensor cable either does not come into contact with the liquid, or comes into contact only insufficiently, or too late, so that an existing leak is not signalised at all or only with a delay.

According to EP 0 783 100 A2, an advanced device for long-term leakage monitoring of tank casings was proposed with a special collection chamber being provided at least partially below the bottom and laterally of the flat tank structure. The known collection chamber can, for example, be formed by an annular pipe which is located below the bottom of the tank, circumferentially surrounding same. The collection chamber is connected with a special cantilever which has been retrofitted to the flat tank structure, with the cantilever having a gradient towards the collection chamber. The cantilever and the, for example, annular pipe form a collection chamber or a collection volume, respectively, which is capable of collecting escaping environmentally hazardous liquids until the drainage of the tank and/or the elimination of the leak, even in the case of major leaks. The cantilever and the collection chamber or the annular pipe, respectively, or the rim of a trench, which together with the cantilever form the collection chamber, are provided in such a manner that a sufficient distance from the tank casing is given so that in the case of a major leak, greater liquid amounts which escape laterally can be collected and come into contact with a sensor cable. The sensor cable itself is arranged in the area of the cantilever or in the bottom area of the collection chamber, e.g. in the bottom of the trench or of the annular pipe. Due to the fact that the sensor cable is made to be liquid selective, entering rain water, for example, will not falsely result in activating a leakage alarm. The solution shown in EP 0 783 100 A2, whose disclosure content is to be explicitly assigned to the subject matter of the application, as will be described in the following, enables a simple retrofitting of existing flat tank structures in an advantageous manner so that it is possible to respond to modified legal regulations of, for example, the Water Resources Management Law. An immediate advantage is that the otherwise necessary large area sealing of the base surfaces of flat tank structures can be omitted so that a natural return flow of rain water is ensured. The problem of a fire hazard, however, is still unsolved, in particular with respect to so-called tanks of Class A1.

In the case where escaping liquids in combination with the ambient air form an explosive mixture or, where due to the properties, there is a risk of self-ignition, probably resulting from an atmospheric discharge, there are considerable risks for tank farms. When, upon the detection of the fire, fighting of the fire is done by means of the usual agents, there is the risk that leakage liquid reaches water-carrying layers and thus the ground water due to large amounts of water or fire extinguishing foam to be used.

SUMMARY OF THE INVENTION

It is therefore the object of the invention to provide a device for long-term leakage monitoring, in particular, of flat tank structures, which makes it possible to increase the safety in the operation of such that tanks or of a plurality of flat tank arrangements, without leaving escaping liquid undetected for a long time, or, in the case of a fire, without fire extinguishing agent in combination with leakage liquid draining off in an uncontrolled manner.

The object of the invention is solved by a fire signaling sensor being located above the collection chamber which, in the case of fire, in cooperation with an extinguishing supply, enables the activation of the automatic forming of the collection chamber, and the collection chamber is a pipe or a pipe segment which surrounds the flat tank structure in an annular manner, comprising inlet slots or inlet holes facing towards the cantilever, with a circumferential collar plate being arranged on the pipe for the formation of in distinguishing agent retention chamber. Disclosed is also the monitoring of a double-wall tank bottom in a particularly advantageous manner, with the double-bottom construction having a glass fibre reinforced layer sequence of synthetic material. According to the invention it is proposed to installed a liquid selective sensor cable within the spacing fabric of the layer sequence so that flat tank structures which have been retrofitted or equipped in such a manner can be monitored with respect to their tightness.

According to an essential basic idea of the invention the tank casing leakage monitoring is further developed by means of an annular collection chamber in such a manner that a signalling fire sensor is arranged above the collection chamber. In the case of a fire, this signalling fire sensor, in cooperation with a fire extinguishing agent supply, e.g. a surrounding fire extinguishing pipe with extinguishing agent outlet openings, enables the activation of the automatic foaming of the collection chamber. By a defined amount of the extinguishing agent, which corresponds to the maximum possible extinguishing agent retention volume, an undesired escape of a mixture of leakage liquid and extinguishing agent into the environment can be prevented.

The inventive extinguishing retention chamber is created by an additional circumferential collar plate which is joined with the pipe or pipe segment which forms the collection chamber and surrounds the tank in an annular manner. Above the collar plate an also circumferential extinguishing foam line with extinguishing agent outlet openings is arranged which, upon the detection of a fire by the fire signalling sensor, allows a directed supply of extinguishing agent into the collection or extinguishing agent retention chamber.

The above described solution makes it possible to meet the requirements of both water protection and fire protection, in particular, with respect to Class A1 tanks. Foaming is effected analogously to the specifications of DIN 14493.

The sensor cable which is arranged at the cantilever or in the bottom area of the collection chamber has hydrocarbon selective properties. In order to achieve a directed drainage of the collection chamber including the extinguishing agent retention chamber, the collection pipe comprises at least one drainage means which is provided with a controllable shut-off means.

In order to increase the effectiveness and for a faster response, the sensor cable is arranged at the end of the cantilever facing the collection chamber and in a manner designed to retain any liquid.

The gradient of the cantilever compensates the height difference between a tank bottom or, respectively, tank or circular foundation relative to the portion of the collection chamber which is on the surrounding level. In one embodiment, the inlet slots of the collection pipe are preferably formed as longitudinal slots.

Instead of a pipe shape, the collection chamber surrounding the flat tank structure may be formed by a rim or trench starting from the end of the cantilever remote from the tank, with the drainage means with shut-off capability being arranged on the rim.

The annulus formed by the pipe or the rim or the trench, respectively, has a diameter which is between 1.5 and 2.5 times the diameter of the flat tank structure so that under consideration of the circumferential collar plate an adequate collection volume for escaping fluid or extinguishing agent, respectively, can be ensured.

As with the known state of the art, the sensor cable is a coaxial cable comprising a dielectric which changes reversibly as a function of the liquid effect, with the liquid or humidity effect being able to be demonstrated by the evaluation of high-frequency pulse echoes.

In order to achieve easy assembly and disassembly, the extinguishing foam line is removably attached at the collar plate. The preferred type of attachment is by means of pipe clamps. At the same time, these pipe clamps can be used for securing the fire signalling sensor, in particular, a fire signalling sensor cable.

With the inventive solution it is achieved that in the case of a major leak, greater amounts of liquids which escape in a lateral direction can be collected and come into contact with a sensor cable. At the same time, fire monitoring and fire fighting of the leakage collection chamber is provided via the fire signal-carrying cable or the fire signalling sensor, respectively.

Existing flat tank structures can be retrofitted with the inventive device in a simple manner, in that they are provided with a cantilever and the other means for forming the collection chamber or the extinguishing agent retention chamber, respectively. Thus, the pertinent legal regulations, e.g. of the Water Resources Management Law, can be fulfilled with minimum expenditure. The use of the inventive device increases the safety in the storage of liquids which are a hazard for water, and it is excluded that, in the case of a leak or even of a fire escaping, environmentally hazardous liquids result in the pollution or a detrimental change of inshore waters or the ground water. The otherwise necessary large area sealing of the base surfaces of flat tank structures can be omitted.

BRIEF DESCRIPTION OF THE DRAWINGS

The invention will be described in more detail with reference to an embodiment and with the aid of figures in the following, in which:

FIG. 3b shows a detail of FIG. 3a.

DESCRIPTION OF PREFERRED EMBODIMENTS

Figure 1:
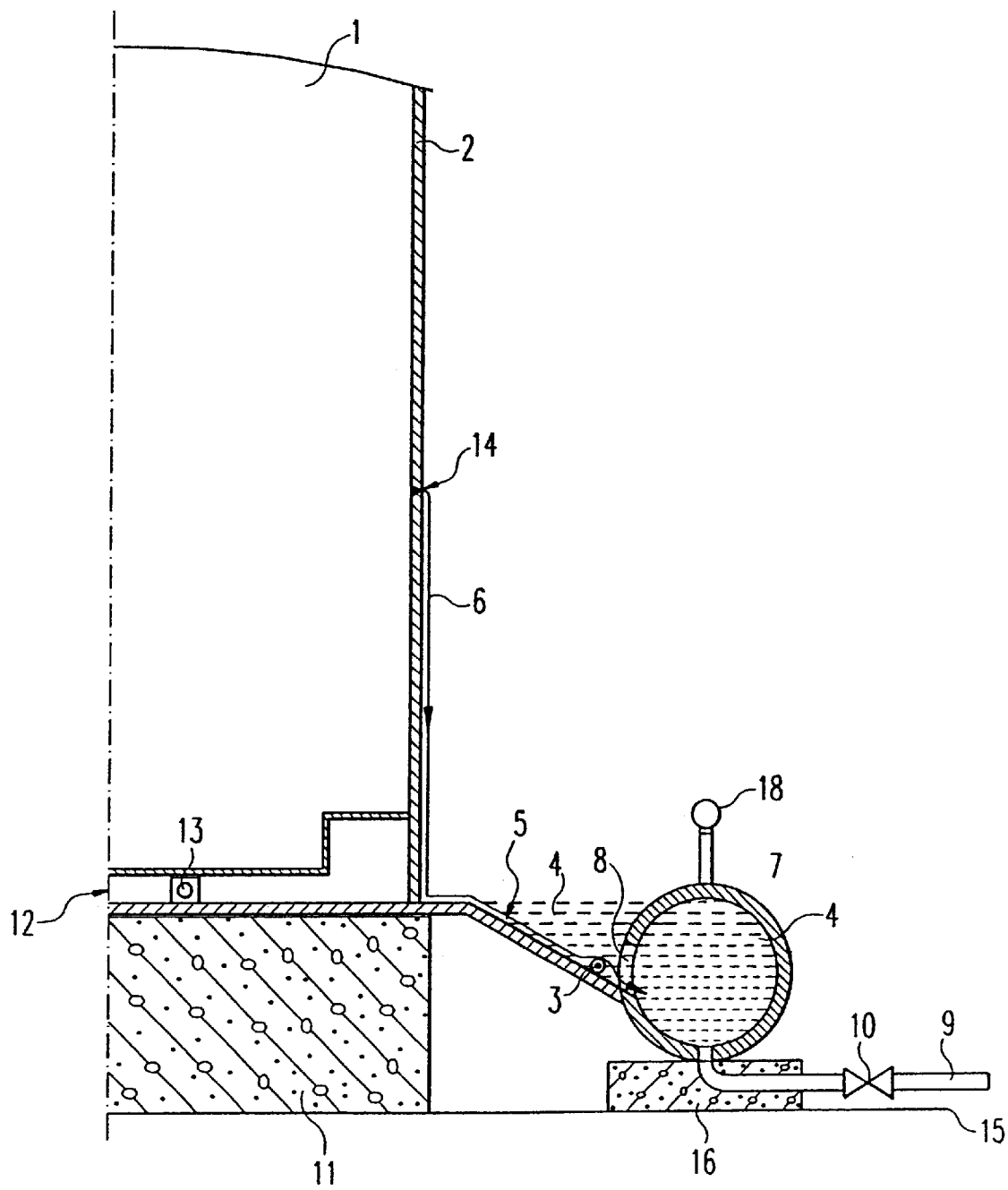
FIG. 1 shows a longitudinal sectional view through a flat tank structure with leakage monitoring at the tank casing.

The flat tank structure 1 according to the basic sectional view of FIG. 1 is located on a circular foundation 11 and comprises a double bottom 12 with installed monitoring liquid sensors 13. Such a known monitoring of the double bottom ensures that leaks in the tank bottom can be detected and corresponding measures taken for putting the flat tank structure 1 out of operation and repairing same.

Residual risks, however, entail the tank casing 2 of the flat tank structure 1 developing cracks, i.e. leaks, in the course of a longer operating life. Such a leak 14 results in leakage flow 6, essentially due to gravity and adhesion in a downward direction along the tank casing 2. In the case of major leaks 14 there is the additional risk that the leakage flow is directed laterally without flowing downward along the tank casing.

According to the embodiment of FIG. 1, a circumferential cantilever 5 is formed at the lower bottom of the double bottom or at the lower end, respectively, of the flat tank structure 1, which is directed towards the surrounding level 15. In the illustrated embodiment, the cantilever 5 merges with an annular pipe or pipe segment 7 which comprises inlet slots or inlet holes 8 extending in the longitudinal direction. The annular pipe 7 comprises a drainage means 9 with a shut-off means 10. The pipe 7 bears against a foundation 16 which is essentially at the same height as the surrounding level 15. A sensor cable 3 is arranged on the top surface of the cantilever 5 or, in another embodiment, is located within the annular pipe 7, in particular at its inner bottom surface.

In the embodiment according to FIG. 1, the sensor cable 3 has a diameter of essentially 12 mm. As a result of these dimensions and the fastening of the sensor cable 3 on the top surface of the cantilever 5 a predetermined barrier space is formed for the leakage flow 6 so that a reliable signal generation due to the change of the dielectric constant of the sensor cable 3 is given.

The sensor cable 3 is connected with a pulse echo transmission and evaluation means (not shown). With the aid of the pulse echo evaluation means the occurrence and the propagation of a leakage flow contact is detected and an alarm activated. At this moment, at the latest, the shut-off means 10 which, e.g. serves to drain the rain water, is closed.

Figure 2:
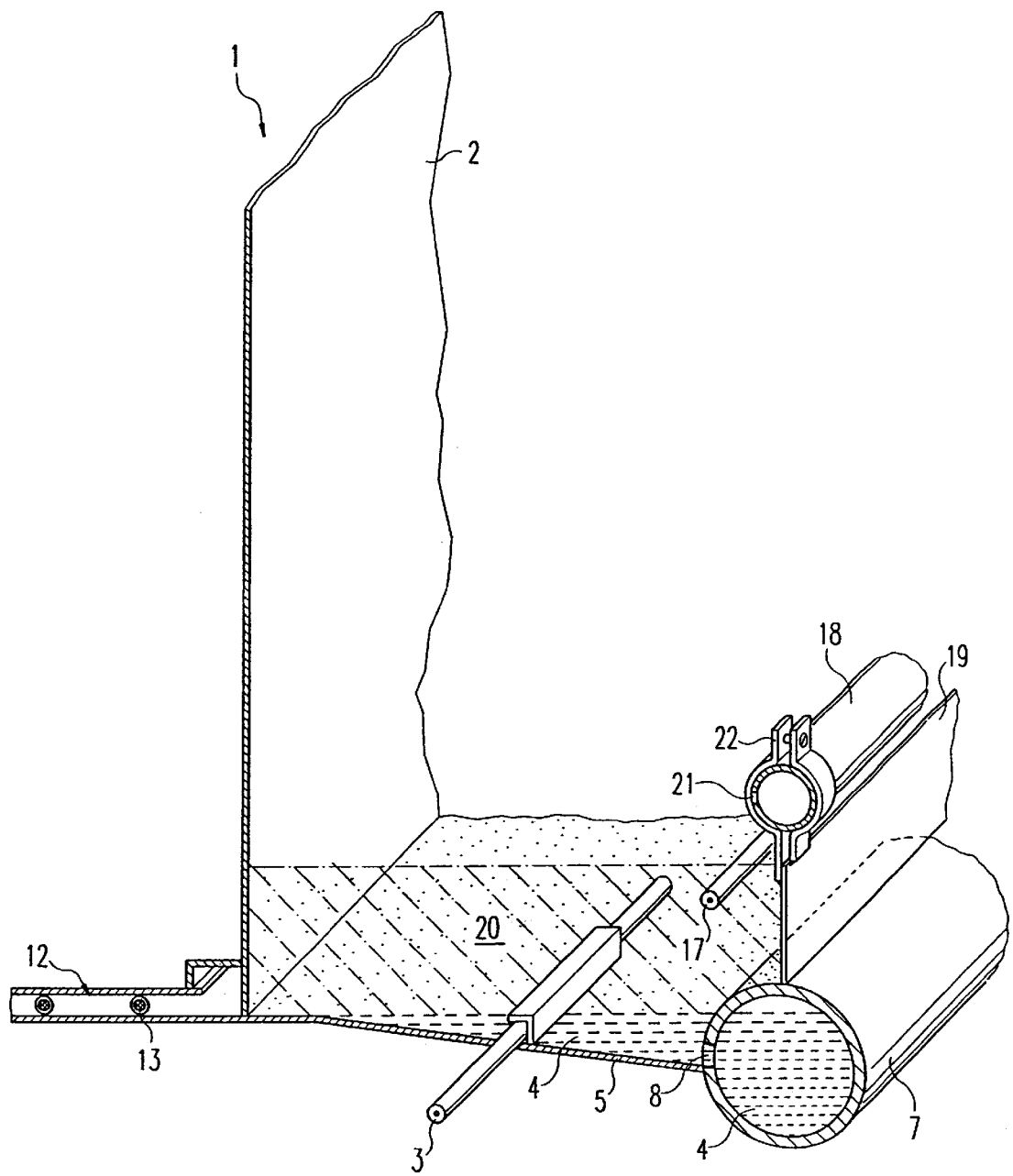
FIG. 2 shows a similar view as FIG. 1, parts of which, however, are shown perspectively.

As can be seen from FIGS. 1 and 2, the cantilever 5 in connection with the annular pipe 7 forms a collection chamber 4 with an adequate volume so that even greater amounts of liquids which leave the tank undesirably can be retained until the damage has been rectified.

The distance between the tank casing 2 and the outer end of the cantilever 5 or an open trench, respectively, which can be formed in place of the annular pipe 7 as an extension of the cantilever, is selected large enough so that also laterally directed leakage flows can reliably be contained. In this case, in particular, it is advantageous to fasten the sensor cable 3 near the trench bottom or at a distance from the tank casing at the corresponding end of the cantilever 5.

It has been found that, from a structural point of view, one collection chamber 4 each, with a capacity of 3 to 3.5 $m^3$, per flat tank structure 1 to be monitored can be formed with reasonable efforts so that even with larger leakage flow volumes there is still enough time to initiate correction measures without a pollution risk for the ground water or waters in general occurring.

According to an embodiment (not shown), the collection chamber can be formed by a cantilever which has the necessary gradient for the height difference between circular foundation 11 and surrounding level 15 and which is flanged under the formation of a trench at the remote end from the tank casing. Such cantilevers can be manufactured in segments and assembled and welded or bonded to the existing flat tank structure on site.

In order to ensure safety against a lateral escape of a leakage flow, a construction has proven suitable where the ring formed by the pipe or the rim or the trench, respectively, which surrounds the flat tank structure 1 has a diameter which is 1.5 times to 2.5 times the diameter of the flat tank structure.

The formation of an extinguishing agent retention chamber indicated in FIG. 1 will be explained in more detail with reference to FIG. 2.

On the pipe 7, in the shown embodiment almost at its highest point, a circumferential collar plate 19 is secured, preferably by welding. The collar plate 19 assumes an essentially vertical position. Between the outer wall 2 of the flat tank structure 1 and the circumferential collar plate 19, the extinguishing agent retention chamber 20 is formed. A fire signalling sensor 17, e.g. a fire signalling cable, is installed preferably at the collar plate 19. The fire signalling cable 17 monitors the potential occurrence of a fire in the collection chamber 4.

At the upper circumferential end of the collar plate 19 a plurality of pipe clamps 22 are arranged, as can be seen in the embodiment, by means of which an extinguishing foam line 18 can be secured. The extinguishing foam line 18 is provided with spaced extinguishing agent outlet openings 21 so that extinguishing agent can be discharged upon a corresponding pressure application towards the extinguishing agent retention chamber 20.

In an embodiment the pipe clamps 22 can simultaneously serve to accommodate the fire signalling sensor or the fire signalling cable 17, respectively.

The volume of the extinguishing agent retention chamber 20 is dimensioned in such a manner that a fire forming in the collection chamber 4 can be reliably fought successfully without there being the risk of an escape of extinguishing agent or a mixture of extinguishing agent and leakage liquid, respectively.

Via the controllable shut-off means 9 and 10 shown in FIG. 1 it is then possible to drain both the collection chamber 4 and the extinguishing agent retention chamber 20 and to dispose of or recycle the removed contents.

Flat tank structures 1 which are already provided with a circumferential collection chamber can be retrofitted with an additional collar plate 19, including the extinguishing foam line 18, in order to meet the requirements of preventive fire protection.

Figure 3A:
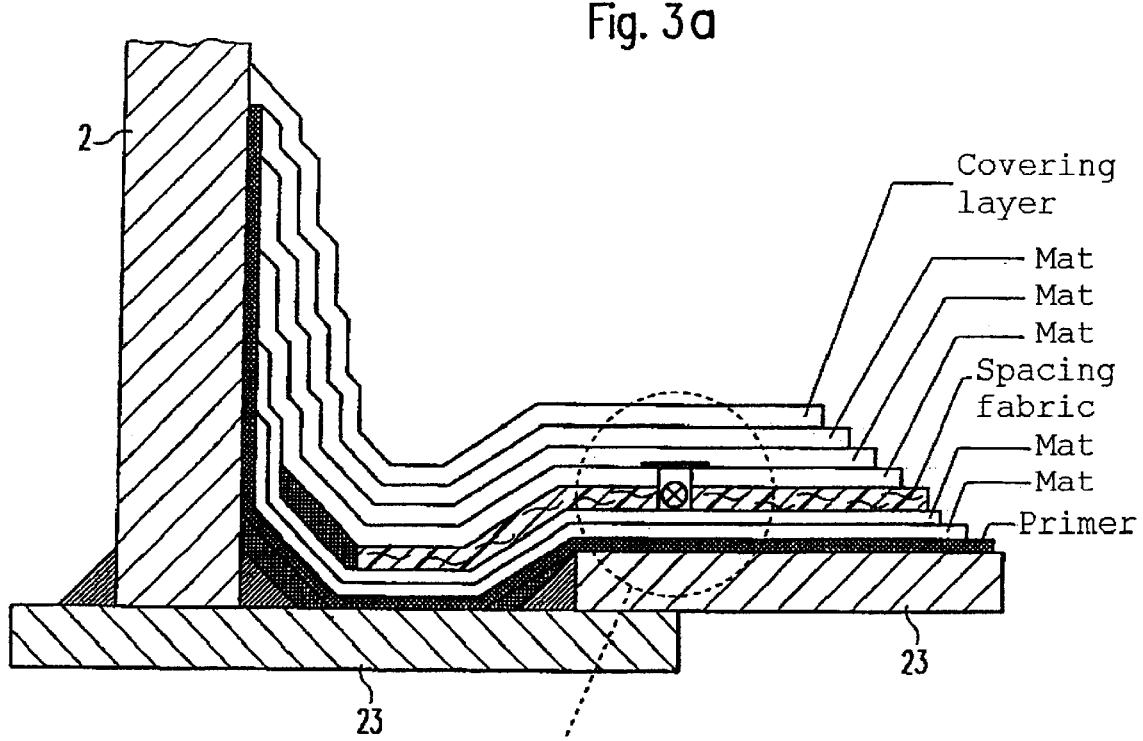
FIG. 3a shows a partial sectional view of a double-bottom casing with a glass fibre reinforced layer sequence of synthetic material.
Figure 3B:
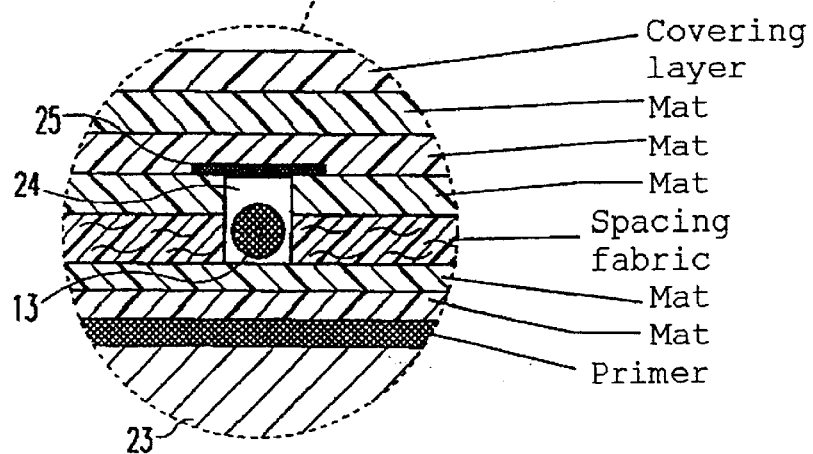

With reference to FIG. 3, the special embodiment of a double-wall tank bottom consisting of a glass fibre reinforced layer sequence of synthetic material which is applied on a metal vessel bottom will now be described in more detail.

In order to additionally seal and monitor a vessel bottom 23, a special glass fibre reinforced layer sequence of synthetic material is applied on the inner surface of the vessel bottom 23 and partially extending into the lower casing area 2.

The inner surface of the vessel bottom 23 is first provided with a layer of adhesive agent (primer), and then a resin layer is applied which comprises a first and a second glass fibre mat. A spacing fabric has a groove 24 which serves to accommodate the sensor cable 13. By means of a cover 25, e.g. adhesive tape, a penetration of the subsequent resin coating into the groove 24 is prevented. The subsequent resin coating consists of three further glass fibre reinforced mats as well as of a covering layer.

In the case of leaks in the upper plastic bottom the water hazardous liquids reach the spacing fabric, i.e. also the area of the groove 24 and thus the sensor cable 13. Upon a corresponding wetting, the dielectric and physical properties of the sensor cable will change so that a leakage alarm can be activated in a manner known per se.

In summary, it is possible with the previously described embodiments to create a device which consists, in particular, of a combination of double bottom and tank casing monitoring, with which flat tank structures can be equipped or retrofitted in order to meet modified regulations with respect to law relating to water. The described solutions are capable of realising a tank or, respectively, tank casing monitoring system which comprises both a double bottom monitoring and a collection trench and leakage detection means which comprise sensor cables, single point sensors, and an evaluation unit. The described device can thus be employed for any size of existing flat tank structures and any size of flat tank structures to be newly constructed which store water-hazardous, non-combustible liquids and water hazardous, combustible liquids of hazard classes A1, A2, A3, B as well as the water hazard classes 0 to 3 as stipulated in the Regulation governing the Storage of Combustible Substances (VBS).

In the case in which leaks occur in the tank casing, the escaping medium predominantly flows along the tank casing, is retained in the collection chamber where a provided sensor cable is wetted. The activation of a leakage alarm is then possible via the sensor cable. In the case of a incipient fire, this is detected by the fire signalling sensor, and automatic, also locally independent fire fighting is performed by means of extinguishing agent containers which can also be arranged decentrally and which enable a foaming of the collection chamber under simultaneous retention of the extinguishing agent. The collection chamber and extinguishing retention chamber form a volume which allows the safe collection even of greater leakage amounts, including fire extinguishing agents, and their disposal after the damage has been rectified.

LIST OF REFERENCE NUMERALS

1 Flat tank structure
2 Tank casing
3 Sensor cable
4 Collection chamber
5 Cantilever
6 Leakage flow
7 Annular pipe or pipe segment
8 Inlet slots or holes, respectively
9 Drainage means
10 Shut-off means
11 Circular foundation
12 Double bottom
13 Monitoring sensors in double bottom 12
14 Leak
15 Surrounding level
16 Foundation
17 Fire signalling sensor
18 Extinguishing agent supply
19 Collar plate
20 Extinguishing agent retention chamber
21 Extinguishing agent outlet openings
22 Pipe clamps
23 Bottom plate
24 Groove
25 Adhesive tape

What is claimed is:

1. A device for long-term leakage monitoring, in particular for flat tank structures comprising a sensor cable (3) arranged on the outer surface of the tank casing (2), a collection chamber (4) which, with respect to its height, is arranged at least partially below the bottom (12) of the flat tank structure (1), surrounding its circumference preferably in an annular manner, and which via an inclined cantilever (5) is connected with the lower end of the outer surface of the tank casing (2), with the sensor cable (3) being arranged on the cantilever (5) or in the bottom area of the collection chamber (4), wherein a fire signaling sensor (17) is located above the collection chamber (4) which, in the case of a fire, in cooperation with an extinguishing supply (18), enables the activation of the automatic foaming of the collection chamber (4), and the collection chamber (4) is a pipe or a pipe segment (7) which surrounds the flat tank structure (1) in an annular manner, comprising inlet slots or inlet holes (8) facing towards the cantilever (5), with a circumferential collar plate (19) being arranged on the pipe (7) for the formation of an open extinguishing agent retention chamber (20) surrounding only a bottom portion of the tank casing (2), wherein a circumferential extinguishing foam line (18) comprising extinguishing agent outlet openings (21) is arranged above the collar plate (19).

2. The device according to claim 1, wherein the sensor cable (3) is a coaxial cable comprising a dielectric which changes reversibly as a function of the liquid effect, with the liquid or humidity effect being able to be demonstrated by the evaluation of high-frequency pulse echoes.

3. The device according to claim 1, wherein the sensor cable (3) is made to be hydrocarbon selective.

4. The device according to claim 1, wherein the collection pipe (7) comprises at least one drainage means (9) provided with a controllable shut-off means (10).

5. The device according to claim 1, wherein the sensor cable (3) is arranged in a contacting and liquid retaining manner at the end of the cantilever (5) which faces towards the collection chamber (4).

6. The device according to claim 1, wherein the gradient of the cantilever (5) compensates the height difference between tank bottom (12) or tank or circular foundation (11), respectively, and the portion of the collection chamber (4) being on the surrounding level (15).

7. The device according to claim 1, wherein the inlet slots (8) are formed as longitudinal slots.

8. The device according to claim 1, wherein the collection chamber (4) surrounding the flat tank structure (1) may be formed by a rim or trench starting from the end of the cantilever (5) remote from the tank.

9. The device according to claim 8, wherein a drainage means with shut-off capability is arranged on the rim.

10. The device according to claim 1, wherein the annulus formed by the pipe or rim or the trench, respectively, has a diameter which is between 1.5 to 2.5 times the diameter of the flat tank structure (1).

11. The device according to claim 1, wherein
the extinguishing foam line (18) is removably attached at the collar plate (19).

12. The device according to claim 11, wherein
the extinguishing foam line (18) can be secured at the collar plate (19) by means of pipe clamps (22), with the pipe clamps (22) simultaneously serving to secure the fire signalling sensor (17), in particular the fire signalling sensor cable.

13. The device according to claim 1, wherein
the combination with a monitoring means of a double-wall tank bottom, with another liquid selective sensor cable (13) being arranged in the hollow spaces of an intermediate layer spacing the inner and outer bottoms.

14. The device according to claim 13, wherein
the double-bottom construction consists of a glass fibre reinforced layer sequence of synthetic material which is applied on a metal vessel bottom (23), with the further sensor cable (13) being routed in the spacing fabric of the layer sequence or in a groove (24), respectively, within the spacing fabric.

* * * * *